Aug. 5, 1969  A. M. LORD ET AL  3,459,596
BATTERY INCLUDING FLUORIDE ELECTROLYTE AND
SULFUR HEXAFLUORIDE
Filed Aug. 24, 1965  2 Sheets-Sheet 1
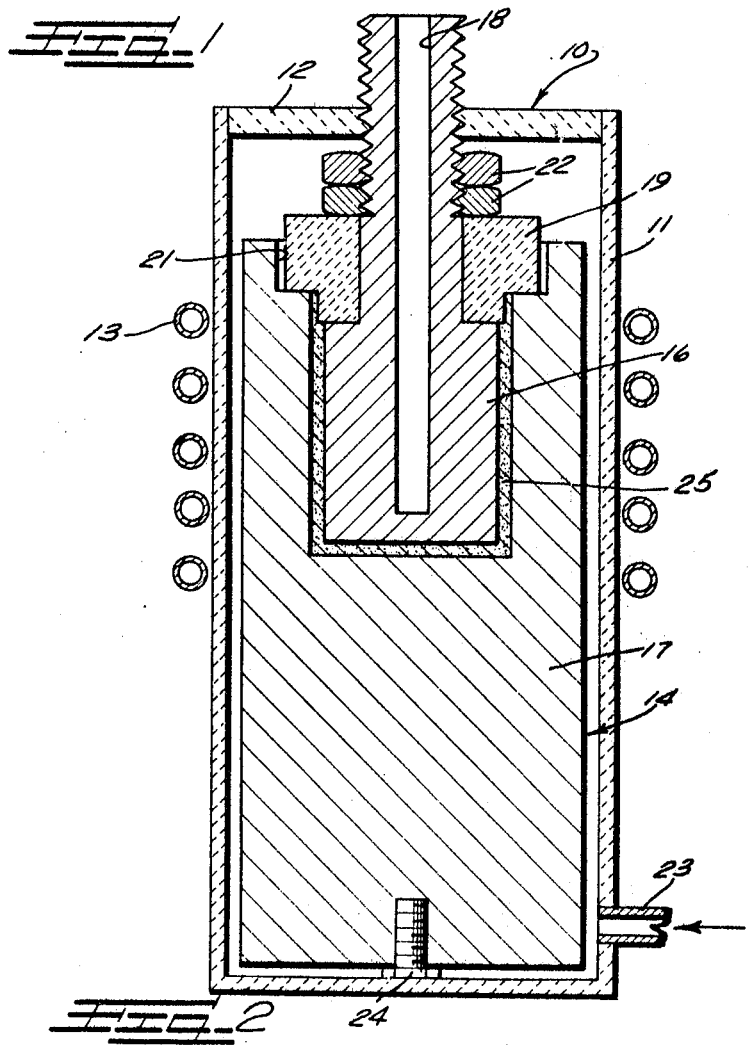
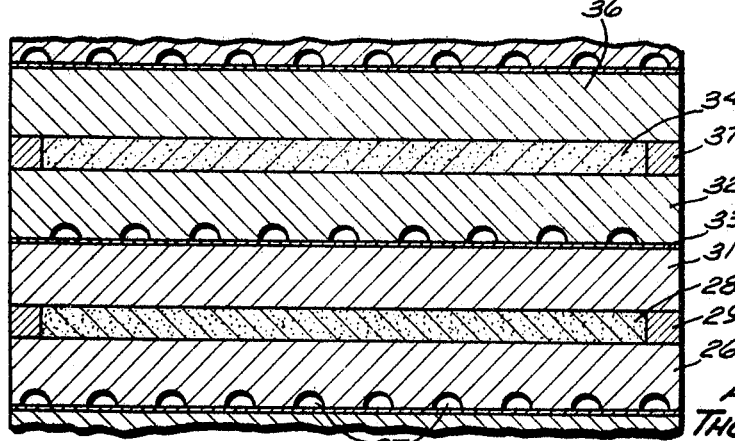
INVENTOR.
ALBERT M. LORD
THOMAS J. WALSH
NICHOLAS FATICA
BY  ATTORNEYS Aug. 5, 1969
A. M. LORD ET AL 3,459,596
BATTERY INCLUDING FLUORIDE ELECTROLYTE AND
SULFUR HEXAFLUORIDE
Filed Aug. 24, 1965
2 Sheets-Sheet 2
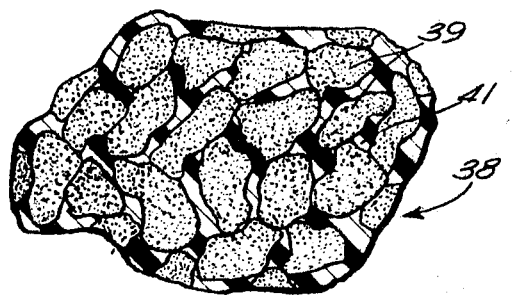
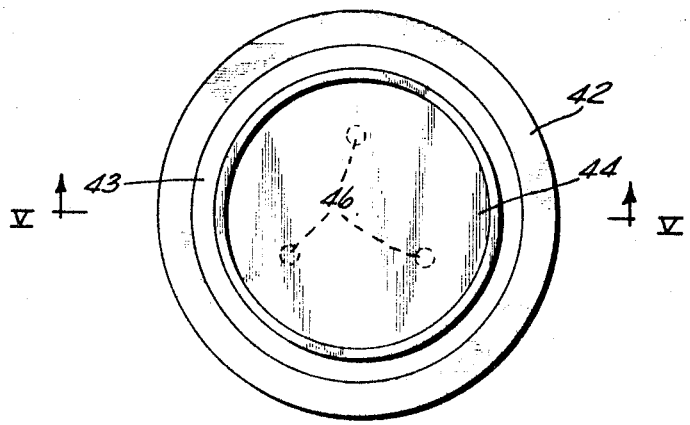
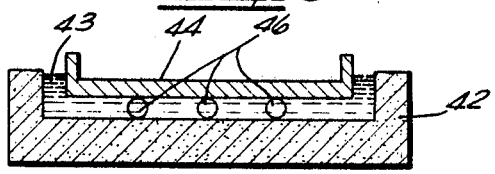
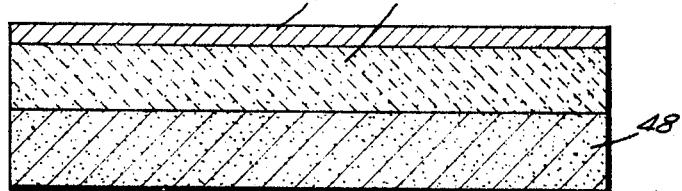
INVENTOR.
ALBERT M. LORD
THOMAS J. WALSH
NICHOLAS FATICA
BY Hill Sherman Meroni Gross & Simpson
ATTORNEYS

United States Patent Office 3,459,596
Patented Aug. 5, 1969

3,459,596
BATTERY INCLUDING FLUORIDE ELECTROLYTE AND SULFUR HEXAFLUORIDE
Albert M. Lord, Lakewood, Thomas J. Walsh, Pepper Pike, and Nicholas Fatica, Cleveland, Ohio, assignors to TRW Inc., Cleveland, Ohio, a corporation of Ohio
Filed Aug. 24, 1965, Ser. No. 482,133
Int. Cl. H01m 27/04
U.S. Cl. 136—86     6 Claims The present invention relates to a high energy density battery, and to a method of generating electrical power.

The present invention provides a battery with high energy density (watt hours per pound) and high power density (watts per pound). Nickel-cadmium and silver-zinc batteries have theoretical energy densities of 80 and 222 watt hours per pound, respectively. Actual batteries deliver about ⅓ of those values. The batteries of the present invention have theoretical power densities many times those of such conventional batteries and tests on working models of the new batteries demonstrate that they actually deliver far more power per unit of weight and volume than do conventional cells.

One of the objects of the invention is to provide an improved high energy density battery of low mass and volume.

Another object of the invention is to provide a battery which is only a small fraction of the size of a conventional battery delivering the same amount of energy.

Still another object of the invention is to provide a method for the generation of electrical power utilizing an improved oxidant circulation system at high temperatures.

In accordance with the present invention, we provide a battery assembly which includes a consumable anode, a gas permeable, electrically conductive inert cathode, an electrolyte between the anode and the cathode which includes a salt having an anion capable of oxidizing the anode, and means for diffusing a gaseous oxidant through the cathode. The battery is designed to operate at high temperatures, and the oxidant is such that it is substantially unreactive toward the electrodes and the electrolyte at room temperatures. Similarly, the electrolyte is one which is relatively nonconductive, electrically and chemically inactive until it is heated generally to temperatures above its melting point.

In one modified form of the invention, the electrodes and electrolyte are positioned in a furnace, and the oxidant gas is introduced into the furnace at the appropriate operating temperature whereupon it diffuses through the porous cathode and enters into the electrochemical power generating reaction within the cell. In another form of the invention, the porous cathode, usually composed of a carbonaceous material such as carbon or graphite, is impregnated with a compound or polymer which decomposes under the operating conditions of the cell to yield an oxidant which thereupon diffuses into the reaction zone.

Although other types of electrolytes can be used, the particularly preferred electrolyte is a molten salt bath containing an anion of the same chemical character as the oxidant. For example, where a fluoride or fluorine gas is used as the oxidant, the molten salt bath may consist of an alkali metal fluoride, or mixtures of alkali metal fluorides of suitable constitution so that they have a relatively low melting point, i.e., a eutectic mixture of such fluoride salts. A sulfur oxidant would be appropriate for an electrolyte of molten sulfides, and so on.

Particularly high energy levels are possible through the use of an oxidant of sulfur hexafluoride, in combination with consumable electrodes such as magnesium, aluminum, and lithium. Since lithium is liquid at the decomposition temperature of sulfur hexafluoride, it has to be used in the form of an impregnated matrix of either ceramic or other refractory materials or as an alloy with magnesium or other metals. Lithium hydride can also be used, which compound has a high enough melting point to remain solid at the cell operating temperature. Beryllium has a very high melting point and is another material suitable for use as an anode.

The following oxidants represent a partial list of those which can be employed to produce high energy density batteries according to the present invention: sulfur, phosphorus, sulfur fluorides, tellurium fluorides, selenium fluorides, phosphorous fluorides, chlorine trifluoride, bromine trifluoride, bromine pentafluoride, iodine pentafluoride, air, and oxygen.

The theoretical energy densities and voltages of various systems of the present invention are tabulated in the following table.

TABLE I

| System | Kw. hr./lb. | Volts |
|---|---|---|
| Oxygen-lithium | 5.84 | 3.27 |
| Oxygen-lithium hydride | 4.56 | 1.93 |
| Oxygen-magnesium | 2.95 | 2.95 |
| Sulfur hexafluoride-lithium | 2.175 | 5.17 |
| Sulfur hexafluoride-magnesium | 1.63 | 4.58 |
| Sulfur hexafluoride-lithium hydride | 1.415 | 3.1 |
| Sulfur hexafluoride-aluminum | 1.335 | 3.4 |
| Sulfur-lithium | 1.145 | 2.17 |

A further description of the present invention will be made in conjunction with the attached sheets of drawings which illustrate several embodiments thereof.

In the drawings:

FIGURE 1 is a vertical cross-sectional view of a battery employing the principles of the present invention;

FIGURE 2 is a fragmentary cross-sectional view of a multicell arrangement according to the present invention;

FIGURE 3 is a greatly enlarged, fragmentary cross-sectional view of a polymer impregnated electrode which can be substituted for the cathode illustrated in FIGURE 1;

FIGURE 4 is a plan view of another form of the invention;

FIGURE 5 is a cross-sectional view taken substantially along the line V—V of FIGURE 4; and FIGURE 6 is a still further modified form of the invention utilizing a laminated type battery structure.

As shown in the drawings:

In FIGURE 1, reference numeral 10 indicates generally a furnace enclosure composed, for example, of a refractory material consisting of a container portion 11 and a suitably fitted top 12. The furnace 10 is heated by any suitable means such as an induction coil 13 disposed therearound.

Inside the furnace 10 is a battery 14 including a consumable metal anode 16 received within the generally cylindrical porous carbon cathode 17 in coaxial relation. The anode 16 has a centrally disposed well 18 for receiving a suitable temperature sensing means, such as a thermocouple.

Fitted around the anode 16 is an insulator collar 19 composed of a highly refractory material such as boron nitride or the like. The collar 19 positions the anode 16 in spaced relation to the internal bore of the cathode 17 by being positioned on a shoulder 21 of the porous carbon cathode 17. A pair of nuts 22 provide for axial adjustment of the anode 16 within the cavity provided in the cathode 17.

The annular space between the anode 16 and the cathode 17 is filled with a molten salt electrolyte 25 the constitution of which, of course, will depend upon the nature of the system and the oxidant to be employed. The oxidant in this form of the invention is introduced through an inlet tube 23 located at the bottom of the furnace 10. A stud 24 threaded into the base of the cathode 17 serves to position the cathode within the furance 10, and to expose the bottom surface of the cathode. The oxidant gas entering through the inlet line 23 is thus able to completely envelop the cathode structure and diffuse uniformly through the cathode into the space in which the electrolyte 25 is located. Suitable electrical connections (not shown) are attached to the anode 16 and the cathode 17.

The multicell battery of FIGURE 2 shows one manner in which individual cells can be built up to provide a high voltage, high energy density battery. In this embodiment of the invention, there is provided a porous carbon cathode 26 having spaced passages 27 therealong to aid in diffusing the oxidant gas through the naturally porous cathode 26. Immediately adjacent the cathode 26 is an electrolyte structure consisting of a porous ceramic or the like 28 impregnated with a molten salt electrolyte. A seal 29 is compressed between the cathode 26 and a consumable metal anode 31 to prevent leakage of electrolyte out of the sides of the structure. The consumable anode 31 is separated from the next adjacent porous carbon cathode 32 by means of a gas-sealing film 33 of electrical conducting character which defines the barrier between the individual cells. The porous carbon cathode 32 is associated with another molten salt electrolyte structure 34 and a consumable anode 36, with a seal means 37 being provided about the electrolyte structure 34. In this way, any number of cells can be combined and electrically connected in series to provide a high voltage, compact structure.

Instead of diffusing the oxidant gas from an outside source into the porous cathode, it is also possible to generate the gas in situ by impregnating the naturally porous carbon electrode with a compound or a polymer which will decompose under the conditions of operation of the cell to provide the oxidant gas. For example, in the greatly enlarged view of FIGURE 3, there is shown a carbon electrode 38 consisting of bonded together particles 39 of carbon. An impregnant 41 consisting of a synthetic resin such as polytetrafluoroethylene fills up the voids of the naturally porous structure. When heated to elevated temperatures, the polymer is decomposed into fluoride containing decomposition products which act as an effective oxidizer and depolarizer for the cathode. These cells give lower power densities than are achieved with the use of oxidants such as sulfur hexafluoride, but do have the advantage of simplicity and compactness.

The structure shown in FIGURE 4 is another modified form of the invention in which there is provided a porous carbon cathode 42 of cup shape, the cup being filled with a molten salt electrolyte 43. A consumable metal anode cup 44 is positioned within the confines of the cathode cup 42. The anode 44 is electrically separated from the cathode surface by suitable insulating means, such as pellets 46 of an electrically insulating, refractory material such as zirconia. Alternatively, the bottom of the metal anode cup 44 can be coated with a porous insulator such as zirconia by eposition by means of the plasma spray process.

The battery of FIGURE 6 is an extremely compact version of the improved batteries of the present invention. This battery consists of a laminated structure including a porous carbon cathode 48 and a consumable metal anode 49 separated by a solid, compressed electrolyte layer 51 consisting of a compressed mixture of refractory particles and electrolyte salts. The electrolyte layer 51 serves to bond together the cathode 48 and the anode 49. The bonding may be done in a press at elevated pressures and temperatures.

The following specific examples illustrate the performance characteristics of some of the cells of the present invention.

EXAMPLE I

A cylindrical battery of the type shown in FIGURE 1 of the drawings was made up with an anode of solid magnesium, and a cathode of porous carbon having a porosity of 48% and a mean pore diameter of 0.0013 inch. The electrolyte was a eutectic mixture of lithium, sodium and potassium fluorides having a melting point of 846° F. The cell assembly was heated up to about 800° F. in an argon atmosphere. Then, the furnace tube was flushed with sulfur hexafluoride while the heating was continued to increase the cell temperature. At about 900° F., the electrolyte became sufficiently conductive for the cells to deliver power. A typical voltage-current characteristic for this cell is given in the following table.

TABLE II

| Cell temperature, ° F. | Current density, amps./sq. ft. | Terminal volts |
| --- | --- | --- |
| 1,100 | 0 | 3.5 |
| 1,100 | 102 | 2.6 |
| 1,100 | 290 | 1.4 |
| 1,145 | 0 | 3.5 |
| 1,145 | 110 | 2.5 |
| 1,145 | 230 | 1.88 |
| 1,145 | 390 | 0.8 |
| 1,490 | 0 | 3.5 |
| 1,490 | 120 | 2.7 |

EXAMPLE II

Carbon cathode shells were impregnated with polytetrafluorethylene to produce the type of structure shown in FIGURE 3. Using the same anode and electrolyte material as in the cell of FIGURE 1, and relying upon the decomposition products of the polymer to provide the oxidant, the following results were obtained:

TABLE III

| Cell temperature, ° F. | Current density, amps./sq. ft. | Terminal volts |
| --- | --- | --- |
| 1,380 | 0 | 2.55 |
| 1,380 | 150 | 1.47 |
| 1,140 | 105 | 1.25 |

EXAMPLE III

A cell was made up as shown in FIGURES 4 and 5, utilizing a carbon cathode, a magnesium anode, and the lithium, sodium, potassium fluoride eutectic described previously. The following table illustrates the performance characteristics of such a cell at a constant temperature for 35 minutes.

TABLE IV

| Cell temperature, ° F. | Current density, amps./sq. ft. | Terminal volts |
| --- | --- | --- |
| 1,020 | 0 | 3.40 |
| 1,020 | 109 | 1.35 |
| 1,020 | 143 | 1.03 |

EXAMPLE IV

Instead of using the insulating spacer pellets described in conjunction with the cell of Example III, the bottom surface of a 0.013 inch thick magnesium anode cup was coated with a porous layer of zirconia deposited by the plasma spray process to a thickness of 0.003 inch. When this type of anode was used in place of the uncoated magnesium anode-pellet combination of FIGURE 4, the following test results were obtained:

TABLE V

| Cell temperature, ° F. | Current density, amps./sq. ft. | Terminal volts |
| --- | --- | --- |
| 1,010 | 0 | 3.2 |
| 1,010 | 84 | 2.1 |
| 1,020 | 0 | 3.3 |
| 1,020 | 88 | 2.2 |
| 1,150 | 0 | 3.3 |
| 1,150 | 70 | 1.8 |

EXAMPLE V

A zirconia matrix cell was made up as shown in FIGURE 6 with a layer of a powdered mixture of zirconia and electrolyte salts being molded and serving to bond together a 0.013 inch thick magnesium disk and a 0.045 inch porous carbon disk. The performance characteristic of one such cell is given in the following table.

TABLE VI

| Cell temperature, ° F. | Current density, amps./sq. ft. | Terminal volts |
| --- | --- | --- |
| 1,110 | 23 | 2.5 |
| 1,110 | 131 | 2.0 |
| 1,110 | 319 | 1.5 |

From the foregoing, it will be evident that the batteries of the present invention can operate at a high rate of power output at various geometries. To compare weight and size with conventional batteries, it might be noted that a molded cell having an electrode area of about 1/200 of a square foot had a weight (without oxidant or outer housing) of 1.65 grams, but that this cell delivers more power than a conventional carbon-zinc D battery weighing 85 grams.

It should be evident that various modifications can be made to the described embodiments without departing from the scope of the present invention.

We claim:
1. A high energy density battery assembly comprising a consumable anode, a gas permeable, electrically conductive, inert cathode, a fluoride electrolyte between said anode and said cathode, and means for diffusing sulfur hexafluoride through said cathode, said electrolyte being substantially nonconductive at temperatures below its melting point.
2. The battery assembly of claim 1 in which said anode is composed of magnesium.
3. The battery assembly of claim 1 in which said anode is composed of aluminum.
4. The battery assembly of claim 1 in which said cathode is composed of porous carbon and said electrolyte is a molten fluoride salt.
5. The battery assembly of claim 1 in which said electrolyte contains a molten alkali metal fluoride.
6. The battery assembly of claim 1 in which said electrolyte is a mixture of molten alkali metal fluorides.

References Cited

UNITED STATES PATENTS

| 2,921,110 | 1/1960 | Crowley et al. | 136—86 |
| 3,294,586 | 12/1966 | Le Duc | 136—86 |

ALLEN B. CURTIS, Primary Examiner

U.S. Cl. X.R.

136—83, 155